(12) United States Patent
Bartholomew et al.

(10) Patent No.: US 12,196,104 B2
(45) Date of Patent: Jan. 14, 2025

(54) FAN BLADE FOR A GAS TURBINE ENGINE

(71) Applicant: ROLLS-ROYCE plc, London (GB)

(72) Inventors: Michael Bartholomew, Oakham (GB); David Higginbottom, Leicester (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/496,251

(22) Filed: Oct. 27, 2023

(65) Prior Publication Data
US 2024/0141792 A1 May 2, 2024

(30) Foreign Application Priority Data
Nov. 2, 2022 (GB) ...................................... 2216273

(51) Int. Cl.
*F01D 5/14* (2006.01)
*F01D 5/30* (2006.01)
*F02C 7/32* (2006.01)

(52) U.S. Cl.
CPC ............... *F01D 5/147* (2013.01); *F01D 5/30* (2013.01); *F02C 7/32* (2013.01); *F05D 2220/36* (2013.01)

(58) Field of Classification Search
CPC . F01D 5/141; F01D 5/147; F01D 5/16; F01D 5/282; F01D 25/02; F01D 5/02; F01D 5/146; F01D 5/20; F01D 17/162; F01D 5/14; F01D 5/145; F01D 5/225; F01D 9/041; F01D 5/30; F04D 29/324; F04D 29/384; F04D 29/325; F04D 29/388; F04D 29/023; F04D 29/544; F04D 29/666; F04D 29/681; F05D 2220/36; F05D 2240/301; F05D 2240/303; F05D 2220/32; F05D 2240/30; F05D 2240/307; F05D 2250/70; F05D 2250/71; F05D 2250/713; F05D 2260/96; F05D 2260/941; F05D 2260/961; F05D 2260/40311; F02C 7/32
See application file for complete search history.

(56) References Cited

U.S. PATENT DOCUMENTS

| 5,439,353 A | 8/1995 | Cook et al. |
| 5,785,498 A | 7/1998 | Quinn et al. |
| 7,497,664 B2 * | 3/2009 | Walter ................... F01D 5/141 |
| | | 416/DIG. 5 |

(Continued)

OTHER PUBLICATIONS

European search report dated Dec. 13, 2023, issued in EP Patent Application No. 23201120.5.

(Continued)

*Primary Examiner* — Eric J Zamora Alvarez

(57) ABSTRACT

A fan blade includes an aerofoil portion including a leading edge extending from a root to a tip and defining a blade span therebetween. A leading edge thickness is defined as a thickness of a cross-section at a given radius at a location along a camber line that is 9% of the total length of the camber line from the leading edge. For cross-sections through the aerofoil portion at radii between 50% and 70% of the blade span from a root radius, the leading edge thickness includes a first maximum value. For cross-sections through the aerofoil portion at radii greater than 70% of the blade span from the root radius, the leading edge thickness includes a second maximum value that is between 105% and 125% of the first maximum value.

11 Claims, 8 Drawing Sheets

(56) References Cited

U.S. PATENT DOCUMENTS

| | | | | |
|---|---|---|---|---|
| 8,152,473 | B2* | 4/2012 | Clemen | F01D 5/141 |
| | | | | 416/DIG. 5 |
| 9,011,081 | B2* | 4/2015 | Gomez | F01D 17/162 |
| | | | | 415/151 |
| 9,506,347 | B2* | 11/2016 | Key | F01D 5/141 |
| 10,865,806 | B2* | 12/2020 | Veitch | F04D 29/668 |
| 10,907,648 | B2* | 2/2021 | Vogiatzis | F04D 29/324 |
| 11,002,149 | B2* | 5/2021 | Bousfield | F01D 5/147 |
| 11,181,120 | B2* | 11/2021 | Nolcheff | F01D 5/141 |
| 11,261,734 | B2* | 3/2022 | Baralon | F04D 29/668 |
| 2014/0255197 | A1 | 9/2014 | Yu | |
| 2017/0023007 | A1 | 1/2017 | Roche et al. | |
| 2018/0119706 | A1 | 5/2018 | Vogiatzis | |
| 2018/0231018 | A1 | 8/2018 | Smith et al. | |
| 2018/0231021 | A1 | 8/2018 | Wilson et al. | |
| 2020/0063569 | A1 | 2/2020 | Baralon et al. | |

OTHER PUBLICATIONS

Great Britain search report dated Apr. 3, 2023, issued in GB Patent Application No. 2216273.9.

* cited by examiner

SECTION A-A

FAN BLADE FOR A GAS TURBINE ENGINE

CROSS-REFERENCE TO RELATED APPLICATIONS

This specification is based upon and claims the benefit of priority from United Kingdom patent application number GB 2216273.9 filed on Nov. 2, 2022, the entire contents of which is incorporated herein by reference.

BACKGROUND

Technical Field

The present disclosure relates to a fan blade for a gas turbine engine.

Description of the Related Art

A gas turbine engine includes a fan having fan blades in front of the gas turbine engine. The fan may produce a substantial amount of engine thrust, for example, about 80% of an overall engine thrust. Thus, an aerodynamic efficiency of the fan blades may have a significant impact on overall engine efficiency, and therefore a significant impact on fuel burn. The aerodynamic efficiency of the fan blades may therefore be of critical importance when designing the fan blades.

During operation, the gas turbine engine may encounter a bird strike, in which a bird, an animal, or a foreign object may collide with the fan blades. Therefore, the fan blades of the gas turbine engine may need to be capable of withstanding an impact from such bird strikes. In other words, a fan blade may need to be designed to be able to retain its structural integrity upon experiencing the bird strike. However, increasing impact withstanding capability of the fan blades often comes at a cost of a severe decrease in the aerodynamic efficiency of the fan blades.

Therefore, there remains a need of a fan blade that has improved impact withstanding capability without a significant decrease in its aerodynamic efficiency.

SUMMARY

According to a first aspect there is provided a fan blade for a gas turbine engine. The fan blade includes an aerofoil portion including a leading edge extending from a root to a tip. A distance between the leading edge at the root and the leading edge at the tip defines a blade span. A leading edge thickness (TLE) is defined as a thickness of a cross-section at a given radius at a location along a camber line that is 9% of the total length of the camber line from the leading edge. For cross-sections through the aerofoil portion at radii between 50% and 70% of the blade span from a root radius, the leading edge thickness includes a first maximum value. For cross-sections through the aerofoil portion at radii greater than 70% of the blade span from the root radius, the leading edge thickness includes a second maximum value. The second maximum value is between 105% and 125% of the first maximum value.

The second maximum value of the leading edge thickness being between 105% and 125% of the first maximum value of the leading edge thickness may significantly improve bird strike capability of the fan blade, with a negligible decrease in an aerodynamic efficiency of the fan blade. Therefore, the fan blade having the second maximum value between 105% and 125% of the first maximum value may maintain its structural integrity upon experiencing a bird strike while having excellent aerodynamic efficiency.

Using computational fluid dynamics (CFD), it has been found that the fan blade having the second maximum value of the leading edge thickness between 105% and 125% of the first maximum value of the leading edge thickness may present a significant improvement in impact capability, while causing a very limited decrease in the aerodynamic efficiency.

In some embodiments, for cross-sections through the aerofoil portion at radii between 60% and 70% of the blade span from the root radius, the leading edge thickness includes a first average value. For cross-sections through the aerofoil portion at radii greater than 80% of the blade span from the root radius, the leading edge thickness includes a second average value. The second average value is between 105% and 125% of the first average value.

The second average value of the leading edge thickness being between 105% and 125% of the first average value of the leading edge thickness may significantly improve bird strike capability of the fan blade, with a negligible decrease in an aerodynamic efficiency of the fan blade. Therefore, the fan blade having the second average value between 105% and 125% of the first average value may maintain its structural integrity upon experiencing a bird strike while having excellent aerodynamic efficiency.

In some embodiments, the first average value may be equal to the first maximum value and the second average value may be equal to the second maximum value.

In some embodiments, for all cross-sections through the aerofoil portion at radii between 60% and 70% of the blade span from the root radius, the leading edge thickness includes a first constant value. For all cross-sections through the aerofoil portion at radii greater than 80% of the blade span from the root radius, the leading edge thickness includes a second constant value. The second constant value is between 105% and 125% of the first constant value.

The second constant value of the leading edge thickness being between 105% and 125% of the first constant value of the leading edge thickness may significantly improve bird strike capability of the fan blade, with a negligible decrease in an aerodynamic efficiency of the fan blade. Therefore, the fan blade having the second constant value between 105% and 125% of the first constant value may maintain its structural integrity upon experiencing a bird strike while having excellent aerodynamic efficiency.

In some embodiments, the first constant value may be equal to the first maximum value and the second constant value may be equal to the second maximum value.

In some embodiments, for all cross-sections through the aerofoil portion at radii greater than 80% of the blade span from the root radius, the leading edge thickness is greater than 105% and less than 125% of the leading edge thickness for all cross-sections through the aerofoil portion at radii between 60% and 70% of the blade span from the root radius.

The leading edge thickness for all cross-sections through the aerofoil portion at radii greater than 80% of the blade span from the root radius being greater than 105% and less than 125% of the leading edge thickness for all cross-sections through the aerofoil portion at radii between 60% and 70% of the blade span from the root radius may significantly improve bird strike capability of the fan blade, with a negligible decrease in an aerodynamic efficiency of the fan blade. Therefore, the fan blade having such a configuration may maintain its structural integrity upon experiencing a bird strike while having excellent aerodynamic efficiency.

In some embodiments, for cross-sections through the aerofoil portion at radii between 70% and 80% of the blade span from the root radius, the leading edge thickness increases linearly with respect to the blade span.

The leading edge thickness increasing linearly with respect to the blade span for cross-sections through the aerofoil portion at radii between 70% and 80% may improve the aerodynamic performance of the fan blade as compared to an abrupt change in the leading edge thickness. Furthermore, the linear increase in the leading edge thickness for cross-sections through the aerofoil portion at radii between 70% and 80% of the blade span from the root radius may minimally impact the aerodynamic performance of the fan blade.

In some embodiments, for cross-sections through the aerofoil portion at radii between 70% and 80% of the blade span from the root radius, the leading edge thickness may increase linearly from the first maximum value to the second maximum value. In some embodiments, for cross-sections through the aerofoil portion at radii between 70% and 80% of the blade span from the root radius, the leading edge thickness may increase linearly from the first average value to the second average value. In some embodiments, for cross-sections through the aerofoil portion at radii between 70% and 80% of the blade span from the root radius, the leading edge thickness may increase linearly from the first constant value to the second constant value.

In some embodiments, the first maximum value, the first average value, and the first constant value are equal to each other.

In some embodiments, the second maximum value, the second average value, and the second constant value are equal to each other.

In some embodiments, the fan blade further includes a platform and a root portion. The root portion extends between the platform and the root of the aerofoil portion.

In some embodiments, a radial extent of the root portion is less than or equal to 7% of the blade span.

In some embodiments, the fan blade further includes a tip portion that extends at least radially away from the tip of the aerofoil portion.

In some embodiments, a radial extent of the tip portion is less than or equal to 7% of the blade span.

According to a second aspect there is provided a gas turbine engine for an aircraft. The gas turbine engine includes an engine core including a turbine, a compressor, and a core shaft connecting the turbine to the compressor. The gas turbine engine further includes a fan located upstream of the engine core. The fan includes a plurality of fan blades. The gas turbine engine further includes a gearbox that receives an input from the core shaft and outputs drive to the fan so as to drive the fan at a lower rotational speed than the core shaft. The plurality of fan blades includes the fan blade of the first aspect.

In some embodiments, the turbine is a first turbine, the compressor is a first compressor, and the core shaft is a first core shaft. The engine core further includes a second turbine, a second compressor, and a second core shaft connecting the second turbine to the second compressor. The second turbine, the second compressor, and the second core shaft are arranged to rotate at a higher rotational speed than the first core shaft.

According to a third aspect there is provided a method of minimising an impact of a bird strike on a fan blade of a gas turbine engine. The fan blade has an aerofoil portion having a leading edge extending from a root to a tip. A distance between the leading edge at the root and the leading edge at the tip defines a blade span. A leading edge thickness (TLE) is defined as a thickness of a cross-section at a given radius at a location along a camber line that is 9% of the total length of the camber line from the leading edge. The method includes providing a first maximum value of the leading edge thickness for cross-sections through the aerofoil portion at radii between 50% and 70% of the blade span from a root radius. The method further includes providing a second maximum value of the leading edge thickness for cross-sections through the aerofoil portion at radii greater than 80% of the blade span from the root radius. The second maximum value is between 105% and 125% of the first maximum value.

The method may significantly improve bird strike capability of the fan blade, with a negligible decrease in an aerodynamic efficiency of the fan blade. The method may allow the fan blade to maintain its structural integrity upon experiencing a bird strike while having excellent aerodynamic efficiency.

In some embodiments, the method further includes providing a first average value of the leading edge thickness for cross-sections through the aerofoil portion at radii between 60% and 70% of the blade span from the root radius. The method further includes providing a second average value of the leading edge thickness for cross-sections through the aerofoil portion at radii greater than 80% of the blade span from the root radius. The second average value is between 105% and 125% of the first average value.

In some embodiments, the method further includes providing a first constant value of the leading edge thickness for all cross-sections through the aerofoil portion at radii between 60% and 70% of the blade span from the root radius. The method further includes providing a second constant value for all cross-sections through the aerofoil portion at radii greater than 80% of the blade span from the root radius. The second constant value is between 105% and 125% of the first constant value.

In some embodiments, the method further includes providing the leading edge thickness for all cross-sections through the aerofoil portion at radii greater than 80% of the blade span from the root radius greater than 105% and less than 125% of the leading edge thickness for all cross-sections through the aerofoil portion at radii between 60% and 70% of the blade span from the root radius.

In some embodiments, the method further includes increasing the leading edge thickness linearly with respect to the blade span for cross-sections through the aerofoil portion at radii between 70% and 80% of the blade span from the root radius.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e., the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

Figure 1:
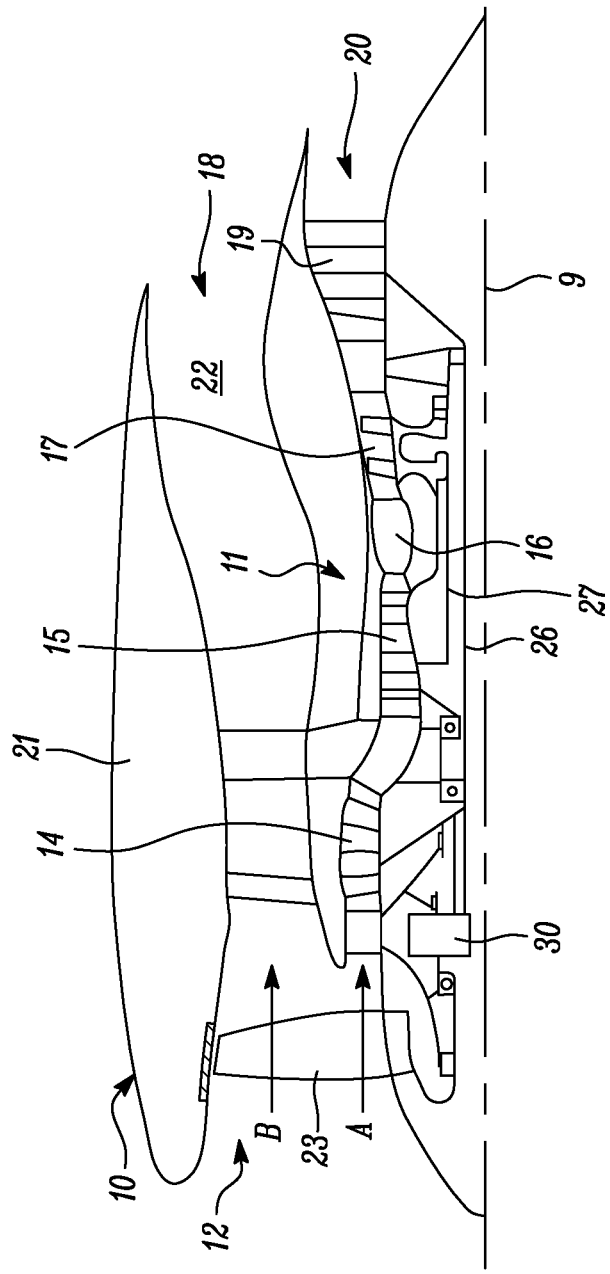
FIG. 1 is a sectional side view of a gas turbine engine.

The following table lists the reference numerals used in the drawings with the features to which they refer:

| Ref no. | Feature | FIG. |
|---|---|---|
| A | Core airflow | 1 |
| B | Bypass airflow | 1 |
| C | Camber Line | 6 |
| D | Point | 4, 5, 7 |
| E | Point | 4, 5, 7 |
| F | Point | 4, 5, 7 |
| G | Point | 4, 5, 7 |
| x | Distance | 6 |
| A-A | Line | 4, 5 |
| TLE | Thickness of the leading edge | 6 |
| T1avg | First average value | 7 |
| T2avg | Second average value | 7 |
| T1c | First constant value | 7 |
| T2C | Second constant value | 7 |
| T1max | First maximum value | 7 |
| T2max | Second maximum value | 7 |
| 9 | Principal and rotational axis (of engine) | 1, 2 |
| 10 | Gas turbine engine | 1 |
| 11 | Core | 1 |
| 12 | Air intake | 1 |
| 14 | Low pressure compressor | 1 |
| 15 | High pressure compressor | 1 |
| 16 | Combustion equipment | 1 |
| 17 | High pressure turbine | 1 |
| 18 | Bypass exhaust nozzle | 1 |
| 19 | Low pressure turbine | 1 |
| 20 | Core exhaust nozzle | 1 |
| 21 | Nacelle | 1 |
| 22 | Bypass duct | 1 |
| 23 | Propulsive fan | 1, 2 |
| 24 | Stationary supporting structure | 2 |
| 26 | Shaft | 1, 2 |
| 27 | Interconnecting shaft | 1 |
| 28 | Sun gear | 2, 3 |
| 30 | Epicyclic gearbox | 1, 2, 3 |
| 32 | Planet gear | 2, 3 |
| 34 | Planet carrier | 2, 3 |
| 36 | Linkage | 2 |
| 38 | Ring gear | 2, 3 |
| 40 | Linkage | 2 |
| 100 | Fan blade | 4, 5 |
| 110 | Aerofoil portion | 4, 5 |
| 120 | Leading edge | 4, 5, 6 |
| 124 | Pressure surface | 6 |
| 126 | Suction surface | 6 |
| 130 | Trailing edge | 4, 5, 6 |
| 140 | Root | 4, 5 |
| 144 | Radial extent/region | 4, 5, 7 |
| 145 | Blade span | 4, 5 |
| 146 | Radial extent/region | 4, 5, 7 |
| 147 | Radial extent/region | 4, 5, 7 |
| 148 | Radial extent/region | 5, 7 |
| 149 | Trailing Edge Span | 4, 5 |
| 150 | Tip | 4, 5 |
| 160 | Platform | 4, 5, 6 |
| 170 | Root Portion | 5 |
| 180 | Tip Portion | 5 |
| 190 | Fixture | 5 |
| 200 | Graph | 7 |
| 300 | Method | 8 |
| 310 | Step | 8 |
| 320 | Step | 8 |

DETAILED DESCRIPTION

Aspects and embodiments of the present disclosure will now be discussed with reference to the accompanying figures. Further aspects and embodiments will be apparent to those skilled in the art.

As used herein, a thickness of an aerofoil section may be defined at a given location on a camber line as a length of a line that is perpendicular to a local direction of the camber line at that location and extends from a pressure surface to a suction surface of the aerofoil section.

Reference to a cross-section through an aerofoil portion at a given percentage along a blade span may mean a section through the aerofoil portion in a plane defined by: a line that passes through a point on a leading edge that is at that percentage along the leading edge from the leading edge root and points in the direction of the tangent to a circumferential direction at that point on the leading edge; and a point on a trailing edge that is at that same percentage along the trailing edge from a trailing edge root.

As referred to herein, a percentage along the leading edge or trailing edge from the root may be, for example, a radial percentage or a spanwise percentage.

Alternatively, reference to a cross-section through an aerofoil portion at a given radial percentage along the blade span may mean a section through the aerofoil that is perpendicular to the radial direction at that radial percentage along the leading edge.

Where reference is made to the axial, radial, and circumferential directions, the skilled person will readily understand this to mean conventional directions when a fan blade is assembled as part of a fan stage or is provided in a gas turbine engine. Viewing the fan blade along a circumferential direction may mean viewing the fan blade in side profile and/or in the meridional plane and/or projected onto a plane defined by the axial and radial directions.

Any fan blade and/or aerofoil portion described and/or claimed herein may be manufactured from any suitable material or combination of materials. For example, at least a part of the fan blade and/or aerofoil may be manufactured at least in part from a composite, for example, a metal matrix composite and/or an organic matrix composite, such as carbon fibre, and/or from a metal, such as a titanium based metal or an aluminium based material (such as an Aluminium-Lithium alloy) or a steel based material.

As used herein, "at least one of A and B" should be understood to mean "only A, only B, or both A and B."

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted.

The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor by a suitable interconnecting shaft 27. The fan 23 generally provides the majority of the propulsive thrust. The epicyclic gearbox 30 is a reduction gearbox.

Figure 2:
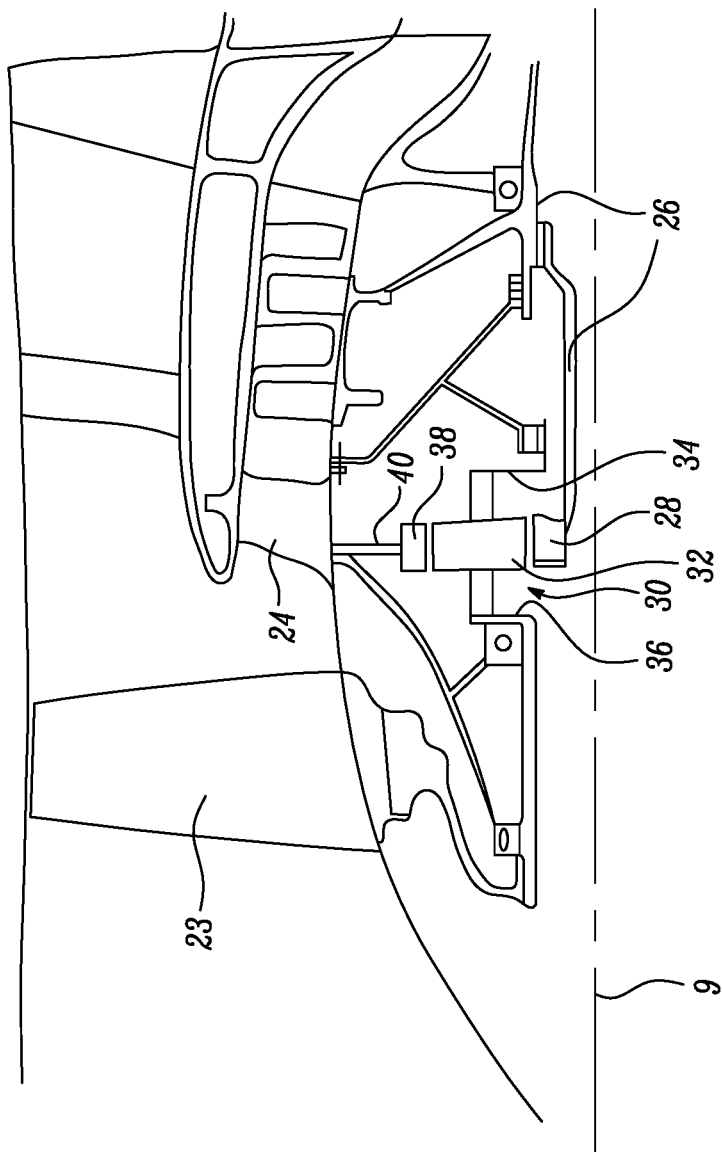
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
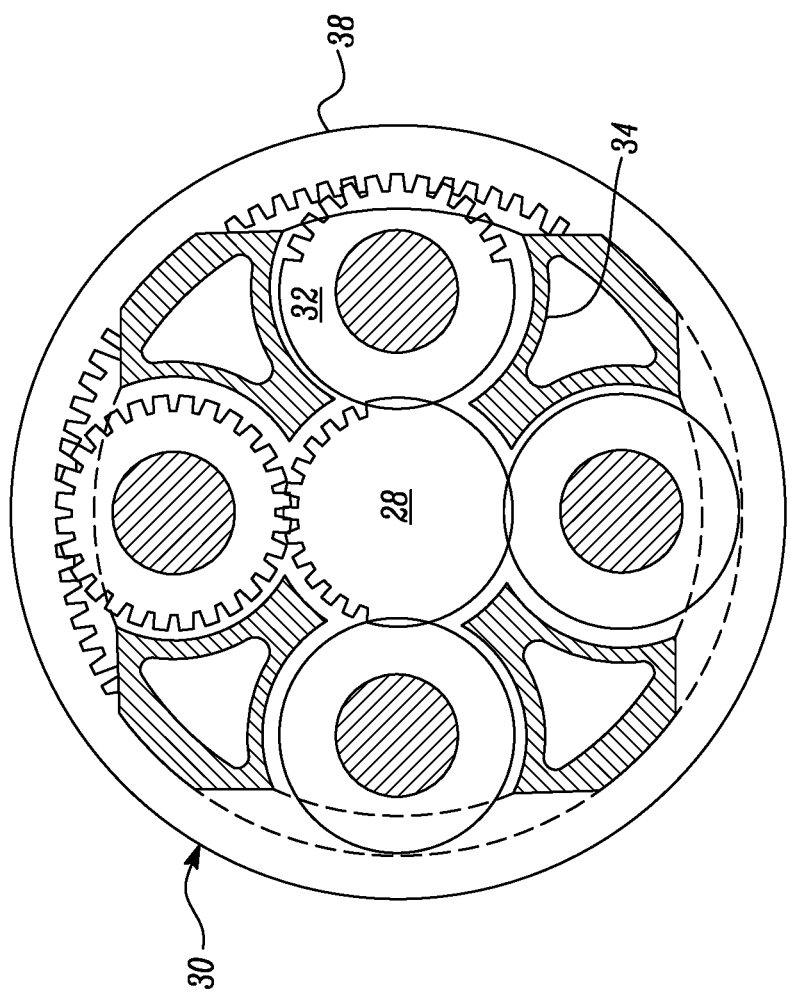
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft, and the fixed structure 24) may have any desired degree of stiffness or flexibility. By way of further example, any suitable arrangement of the bearings between rotating and stationary parts of the engine (for example, between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

As discussed above, in some embodiments, the gas turbine engine 10 may include the engine core 11 including the turbine 19, the compressor 14, and the core shaft 26 connecting the turbine 19 to the compressor 14. The gas turbine engine 10 may further include the fan 23 located upstream of the engine core 11. The fan 23 may include a plurality of fan blades. The gas turbine engine 10 may further include the gearbox 30 that receives an input from the core shaft 26 and outputs drive to the fan 23 so as to drive the fan 23 at a lower rotational speed than the core shaft 26. In some embodiments, the turbine may be a first turbine 19, the compressor may be a first compressor 14, and the core shaft may be a first core shaft 26. The engine core 11 may further include a second turbine 17, a second compressor 15, and a second core shaft 27 connecting the second turbine 17 to the second compressor 15. The second turbine 17, the second compressor 15, and the second core shaft 27 may be arranged to rotate at a higher rotational speed than the first core shaft 26.

Figure 4:
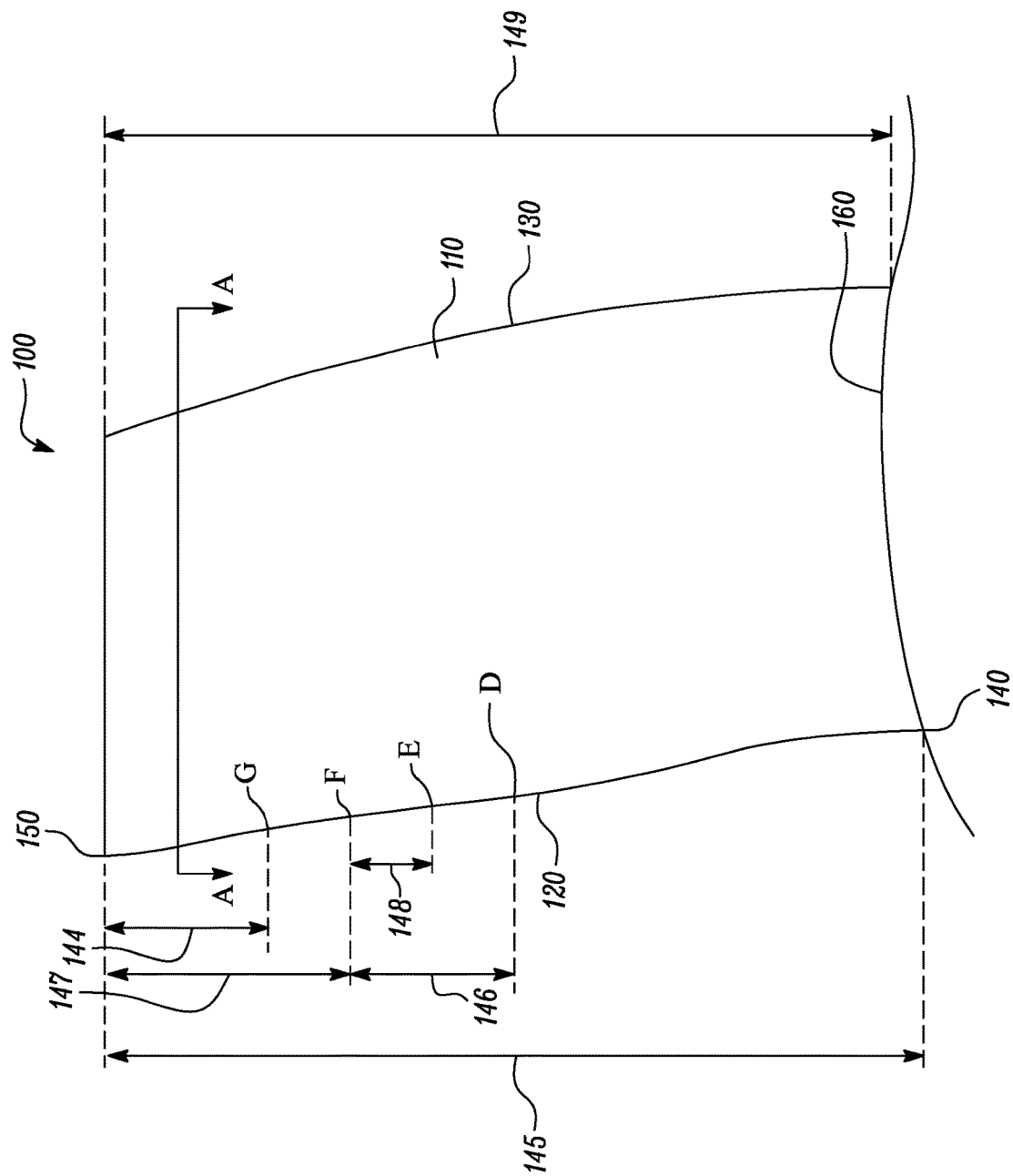
FIG. 4 is a schematic side view of a fan blade in accordance with an embodiment of the present disclosure.

FIG. 4 shows a fan blade 100 for the gas turbine engine 10 (shown in FIG. 1) in accordance with an embodiment of the present disclosure.

The fan blade 100 includes an aerofoil portion 110. The aerofoil portion 110 includes a leading edge 120 and a trailing edge 130. The aerofoil portion 110 extends from a root 140 to a tip 150 in a substantially radial spanwise direction. The leading edge 120 may be defined as a line defined by axially forwardmost points of the aerofoil portion 110 from the root 140 to the tip 150.

A blade span 145 is defined as a distance in a radial direction between the leading edge 120 at the root 140 and the leading edge 120 at the tip 150. A radius of the leading edge 120 at the root 140 may be referred to as a root radius. The radius of the leading edge 120 at the tip 150 may be referred to as a tip radius. A trailing edge span 149 may be defined as a distance in the radial direction between the trailing edge 130 at the root 140 and the tip 150.

A radial extent 144 is shown schematically in FIG. 4. The radial extent 144 represents a region at a radius greater than 80% of the blade span 145 from the root radius, with the point at a radius of 80% of the blade span 145 from the root radius being labelled as point G. The radial extent 144 may be interchangeably referred to as "the region 144".

A radial extent 147 is further shown schematically in FIG. 4. The radial extent 147 represents a region at a radius greater than 70% of the blade span 145 from the root radius, with a point at a radius of 70% of the blade span 145 from the root radius being labelled as point F. The radial extent 147 may be interchangeably referred to as "the region 147".

A radial extent 146 is further shown schematically in FIG. 4. The radial extent 146 represents a region between a point D at a radius of 50% of the blade span 145 from the root radius and the point F at the radius of 70% of the blade span 145 from the root radius. The radial extent 146 may be interchangeably referred to as "the region 146".

A radial extent 148 is further shown schematically in FIG. 4. The radial extent 148 represents a region between a point E at a radius of 60% of the blade span 145 from the root radius and the point F at the radius of 70% of the blade span 145 from the root radius. The radial extent 148 may be interchangeably referred to as "the region 148".

Figure 6:
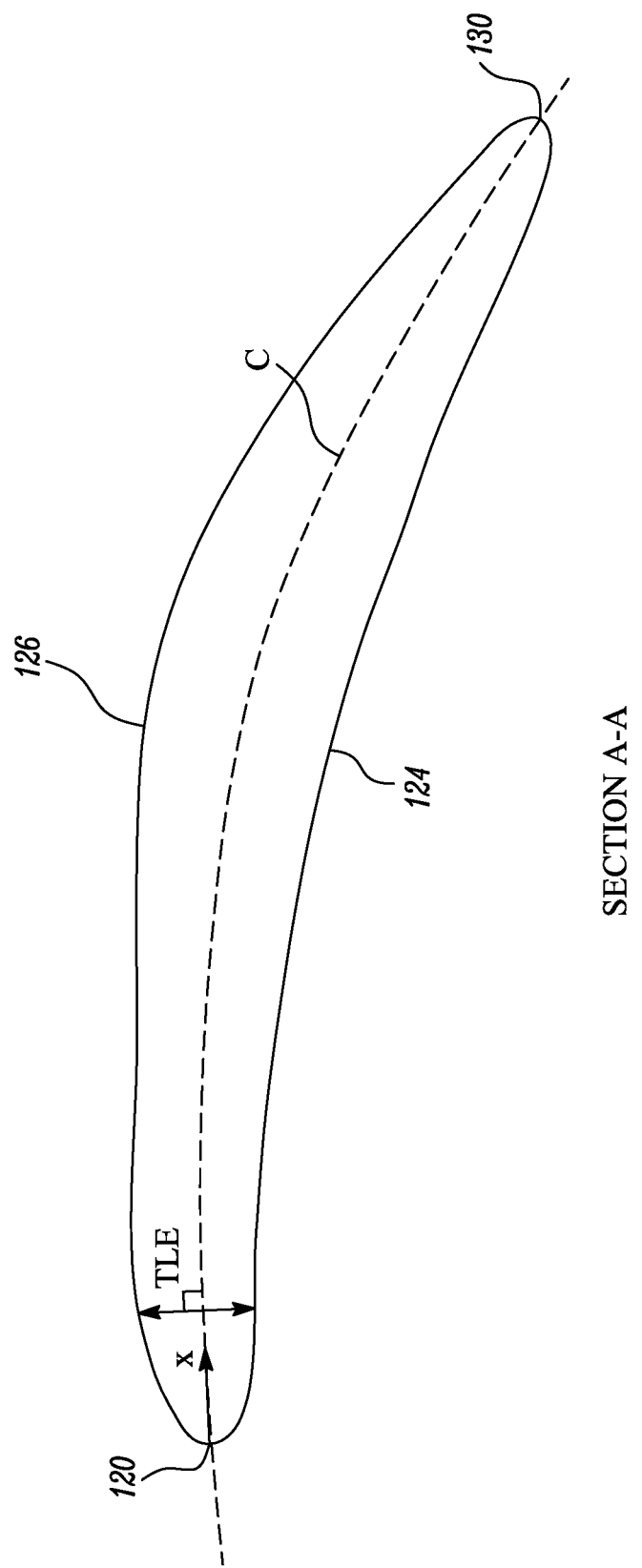
FIG. 6 is a schematic cross-sectional view taken along a line A-A through the fan blade of FIG. 4 in accordance with an embodiment of the present disclosure.

A cross section taken along a line A-A through the aerofoil portion 110 within the radial extent 147 is shown in FIG. 6. The cross-section A-A passes through a point that is greater than 70% of the blade span 145 from the leading edge 120 at the root 140 and a point that is the same percentage of the trailing edge span 149 from the trailing edge root.

Figure 5:
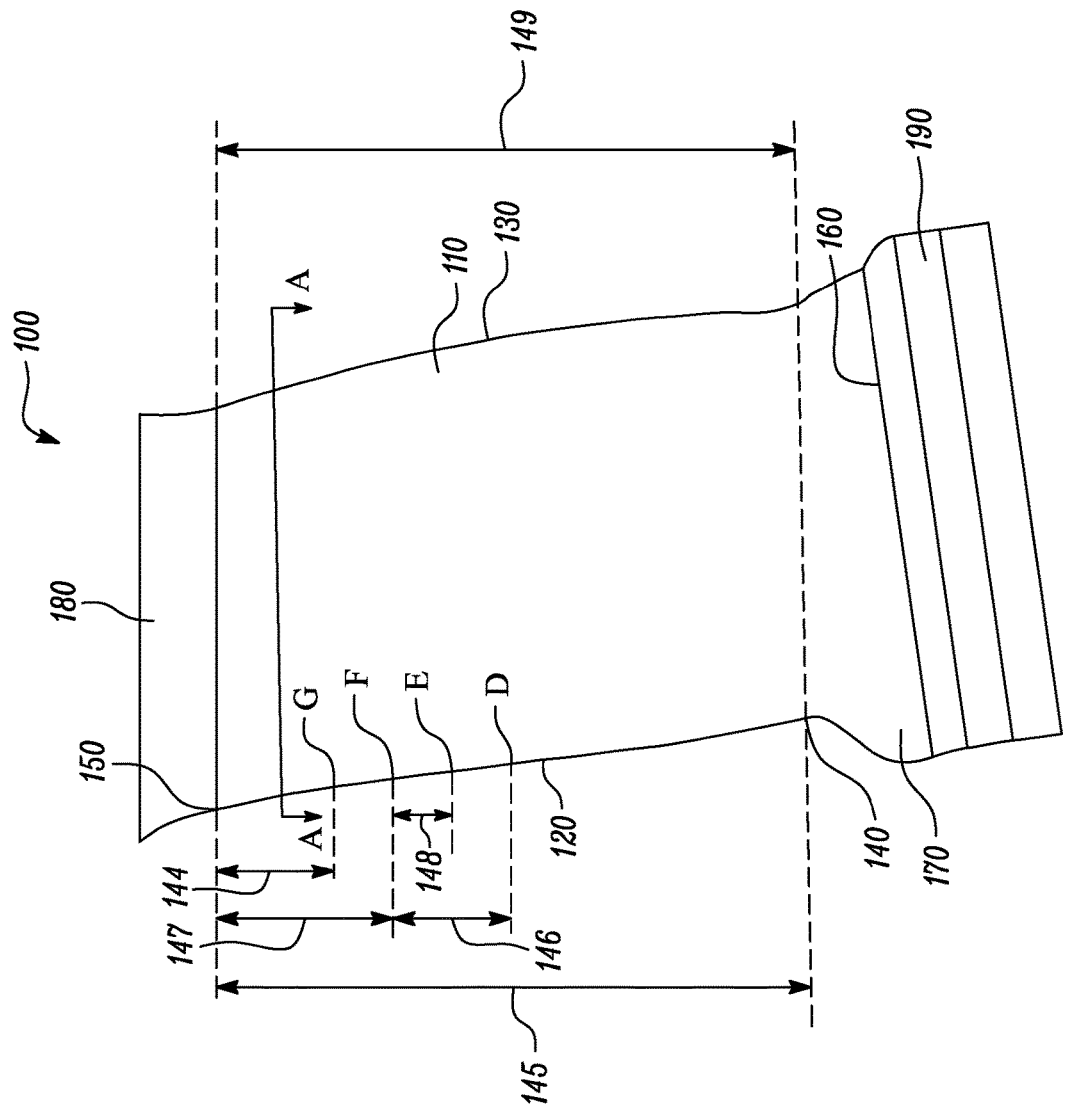
FIG. 5 is a schematic side view of a fan blade in accordance with another embodiment of the present disclosure.

The fan blade 100 may further include a platform 160. The aerofoil portion 110 may extend directly from the platform 160, as shown in FIG. 4. Alternatively, as shown in FIG. 5, the fan blade 100 may include a root portion 170. The root portion 170 may extend between the platform 160 and the root 140 of the aerofoil portion 110. A radial extent of the root portion 170 may be less than or equal to 7% of the blade span 145. In some examples, the radial extent of the root portion 170 may be less than or equal to 5% of the blade span 145.

As shown in FIG. 5, the fan blade 100 may further include a tip portion 180. The tip portion 180 may extend from the tip 150 of the aerofoil portion 110. Specifically, the tip portion 180 may extend at least radially away from the tip 150 of the aerofoil portion 110. A radial extent of the tip portion 180 may be less than or equal to 7% of the blade span 145. In some examples, the radial extent of the tip portion 180 may be less than or equal to 5% of the blade span 145.

As shown in FIG. 5, regardless of the whether the fan blade 100 includes the root portion 170 and/or the tip portion 180, the blade span 145 is defined between the root 140 and the tip 150 of the aerofoil portion 110. Similarly, the regions 144, 146, 147, and 148 described above in relation to FIG. 4 are also defined in relation to the blade span 145 defined between the root 140 and the tip 150, regardless of whether the fan blade 100 includes the root portion 170 and/or the tip portion 180. The cross-sectional location A-A in the region 147 is also shown in FIG. 5.

As noted above, FIG. 6 shows the cross-section A-A defined herein. The cross-section includes a camber line C (which may alternatively be referred to as a mean line). The camber line C may be defined as a line formed by the points equidistant from a pressure surface 124 and a suction surface 126 of the fan blade 100. A distance along the camber line C from the leading edge 120 is indicated by the letter x in FIG. 6. A total length of the camber line C is a length of the dashed line between the leading edge 120 and the trailing edge 130.

A thickness at a given position x along the camber line C may be defined as a length of a line that is perpendicular to the camber line C at the location x and extends from the pressure surface 124 to the suction surface 126. In FIG. 6, a thickness of the leading edge 120 is indicated as TLE. TLE is the thickness of an aerofoil section at a given radius at a position along the camber line C that is 9% of the total length of the camber line C from the leading edge 120. This definition is used in order to be sufficiently far from the leading edge 120 itself to avoid the influence of a curvature of the leading edge 120 (which may be, for example, an ellipse shape) on the thickness.

Figure 7:
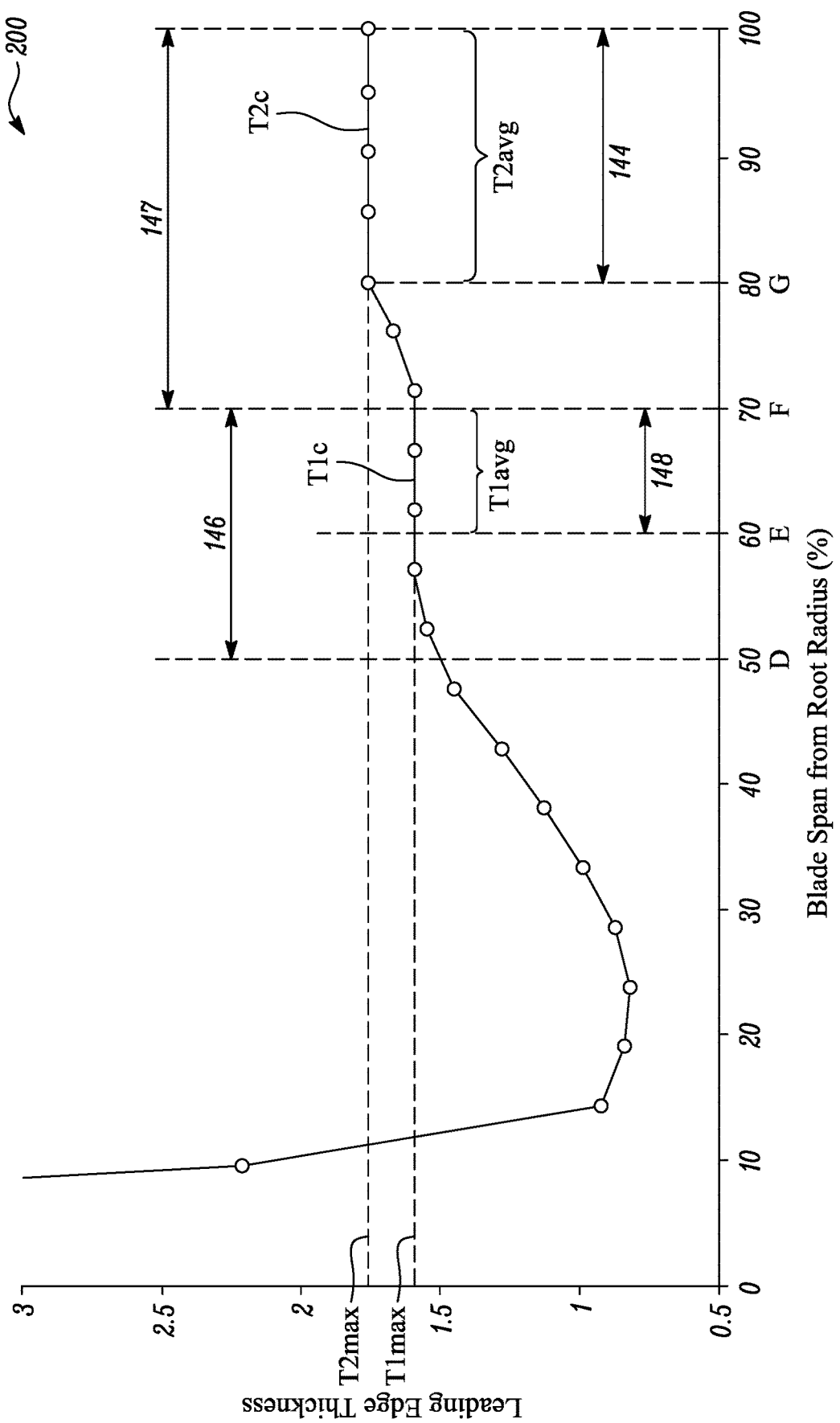
FIG. 7 is a graph depicting a variation of a leading edge thickness of a fan blade with respect to its blade span from the root radius in accordance with an embodiment of the present disclosure.

FIG. 7 shows a graph 200 depicting a variation of the leading edge thickness (TLE) with respect to the blade span 145 from the root radius of the fan blade 100 in accordance with an embodiment of the present disclosure.

Referring to FIGS. 4 to 7, for cross-sections through the aerofoil portion 110 at radii between 50% (indicated by the letter D in FIGS. 4, 5 and 7) and 70% (indicated by the letter F in FIGS. 4, 5, and 7) of the blade span 145 from the root radius, the leading edge thickness TLE includes a first maximum value T1max. In other words, the leading edge thickness TLE has the first maximum value T1max in the region 146. The first maximum value T1max may be defined as a maximum value of the leading edge thickness TLE in the region 146.

Furthermore, for cross-sections through the aerofoil portion 110 at radii greater than 70% (indicated by the letter F in FIGS. 4, 5, and 7) of the blade span 145 from the root radius, the leading edge thickness TLE includes a second maximum value T2max. In other words, the leading edge thickness TLE has the second maximum value T2max in the region 147. The second maximum value T2max may be defined as a maximum value of the leading edge thickness TLE in the region 147.

The second maximum value T2max is between 105% and 125% of the first maximum value T1max. In other words, the second maximum value T2max is between 1.05 times to 1.25 times of the first maximum value T1max.

The second maximum value T2max being between 105% and 125% of the first maximum value T1max may significantly improve bird strike capability of the fan blade 100, with a negligible decrease in an aerodynamic efficiency of the fan blade 100. Therefore, the fan blade 100 having the second maximum value T2max between 105% and 125% of the first maximum value T1max maintain its structural integrity upon experiencing a bird strike while having excellent aerodynamic efficiency.

In some embodiments, for cross-sections through the aerofoil portion at radii between 60% (indicated by the letter E in FIGS. 4, 5, and 7) and 70% (indicated by the letter F in FIGS. 4, 5, and 7) of the blade span 145 from the root radius, the leading edge thickness TLE may include a first average value T1avg. The first average value T1avg may be defined as an average value of the leading edge thickness TLE for all cross-sections through the aerofoil portion 110 at radii between 60% and 70% of the blade span 145 from the root radius. In other words, the first average value T1 avg may be the average value of the leading edge thickness TLE in the region 148.

Further, for cross-sections through the aerofoil portion at radii greater than 80% (indicated by the letter G in FIGS. 4, 5, and 7) of the blade span 145 from the root radius, the leading edge thickness TLE includes a second average value T2avg. The second average value T2avg may be defined as an average value of the leading edge thickness TLE for all cross-sections through the aerofoil portion 110 at radii greater than 80% of the blade span 145 from the root radius. In other words, the second average value T2avg may be the average value of the leading edge thickness TLE in the region 144.

The second average value T2avg may be between 105% and 125% of the first average value T1avg. The second average value T2avg being between 105% and 125% of the first average value T1 avg may significantly improve bird strike capability of the fan blade 100, with a negligible decrease in an aerodynamic efficiency of the fan blade 100. Therefore, the fan blade 100 having the second average value T2avg being between 105% and 125% of the first average value T1avg may maintain its structural integrity upon experiencing a bird strike while having excellent aerodynamic efficiency.

In some embodiments, for all cross-sections through the aerofoil portion 110 at radii between 60% (indicated by the letter E in FIGS. 4, 5, and 7) and 70% (indicated by the letter F in FIGS. 4, 5, and 7) of the blade span 145 from the root radius, the leading edge thickness TLE may include a first constant value T1c. In other words, the leading edge thickness TLE may have the first constant value T1c in the region 148. In some embodiments, as shown in the graph 200 of FIG. 7, the first constant value T1 c may be equal to the first maximum value T1max. However, in some other embodiments, the first constant value T1c may be different from the first maximum value T1max. Further, in some embodiments, as shown in the graph 200 of FIG. 7, the first constant value T1 c may be equal to the first average value T1 avg.

Furthermore, for all cross-sections through the aerofoil portion 110 at radii greater than 80% (indicated by the letter G in FIGS. 4, 5, and 7) of the blade span 145 from the root radius, the leading edge thickness TLE may include a second constant value T2c. In other words, the leading edge thickness TLE may have the second constant value T2c in the region 144. In some embodiments, as shown in the graph 200 of FIG. 7, the second constant value T2c may be equal to the second maximum value T1max. However, in some other embodiments, the second constant value T2c may be different from the second maximum value T2max. Further, in some embodiments, as shown in the graph 200 of FIG. 7, the second constant value T2c may be equal to the second average value T2avg.

The second constant value T2c may be between 105% and 125% of the first constant value T1c. The second constant value T2c being between 105% and 125% of the first constant value T1 c may significantly improve bird strike capability of the fan blade 100, with a negligible decrease in an aerodynamic efficiency of the fan blade 100. Therefore, the fan blade 100 having the second constant value T2c being between 105% and 125% of the first constant value T1 c may maintain its structural integrity upon experiencing a bird strike while having excellent aerodynamic efficiency.

In some embodiments, as shown in FIG. 7, for all cross-sections through the aerofoil portion 110 at radii greater than 80% (indicated by the letter G in FIGS. 4, 5, and 7) of the blade span 145 from the root radius, the leading edge thickness TLE may be greater than 105% and less than 125% of the leading edge thickness TLE for all cross-sections through the aerofoil portion 110 at radii between 60% (indicated by the letter E in FIGS. 4, 5, and 7) and 70% (indicated by the letter F in FIGS. 4, 5, and 7) of the blade span 145 from the root radius. In other words, the leading edge thickness TLE at each cross-section through the aerofoil portion 110 in the region 144 may be greater than 105% and less than 125% of the leading edge thickness TLE at each cross-section through the aerofoil portion 110 in the region 148.

The leading edge thickness TLE for all cross-sections through the aerofoil portion 110 at radii greater than 80% of the blade span 145 from the root radius being greater than 105% and less than 125% of the leading edge thickness TLE for all cross-sections through the aerofoil portion 110 at radii between 60% and 70% of the blade span 145 from the root radius may significantly improve bird strike capability of the fan blade 100, with a negligible decrease in an aerodynamic efficiency of the fan blade 100. Therefore, the fan blade 100 having such a configuration may maintain its structural integrity upon experiencing a bird strike while having excellent aerodynamic efficiency.

In some embodiments, for cross-sections through the aerofoil portion 110 at radii between 70% (indicated by the letter F in FIGS. 4, 5, and 7) and 80% (indicated by the letter G in FIGS. 4, 5, and 7) of the blade span 145 from the root radius, the leading edge thickness TLE may increase linearly with respect to the blade span 145. For example, as shown in FIG. 7, the leading edge thickness TLE may increase linearly from 70% to 80% of the blade span 145 from the root radius.

The leading edge thickness TLE increasing linearly with respect to the blade span 145 for cross-sections through the aerofoil portion 110 at radii between 70% and 80% from the root radius may improve the aerodynamic performance of the fan blade 100 as compared to an abrupt change in the leading edge thickness TLE. Furthermore, the linear increase in the leading edge thickness TLE for cross-sections through the aerofoil portion 110 at radii between 70% and 80% of the blade span from the root radius may minimally impact the aerodynamic performance of the fan blade 100.

In some embodiments, for cross-sections through the aerofoil portion 110 at radii between 70% and 80% of the blade span 145 from the root radius, the leading edge thickness TLE may increase linearly from the first maximum value T1max to the second maximum value T2max. In some embodiments, for cross-sections through the aerofoil portion 110 at radii between 70% and 80% of the blade span 145 from the root radius, the leading edge thickness TLE may increase linearly from the first average value T1 avg to the second average value T2avg. In some embodiments, for cross-sections through the aerofoil portion 110 at radii between 70% and 80% of the blade span 145 from the root radius, the leading edge thickness TLE may increase linearly from the first constant value T1c to the second constant value T2c.

In some embodiments, the first maximum value T1max, the first average value T1avg, and the first constant value T1c are equal to each other. That is, in some embodiments, T1max=T1avg=T1c.

In some embodiments, the second maximum value T2max, the second average value T2avg, and the second constant value T2c are equal to each other. That is, in some embodiments, T2max=T2avg=T2c.

It will be appreciated that the geometry represented by the graph 200 in FIG. 7 is exemplary only, and a great many other geometries are possible in accordance with the present disclosure.

As discussed above with reference to FIG. 1, the gas turbine engine 10 includes the fan 23 including the plurality of fan blades. The plurality of fan blades may include the fan blade 100.

The fan blade 100 may be attached to a hub in any desired manner. For example, the fan blade 100 may include a fixture 190, such as that shown in FIG. 5, that may engage a corresponding slot in the hub (or disc). Purely by way of example, such a fixture may be in the form of a dovetail that may slot into and/or engage a corresponding slot in the hub/disc in order to fix the fan blade 100 to the hub/disc.

Alternatively, the fan blade 100 and the hub may be formed as a unitary part, with no mechanical and/or releasable connections, so as to form a unitary fan stage. Such a unitary fan stage may be referred to as a "blisk". Such a unitary fan stage may be manufactured in any suitable manner, for example by machining and/or by linear friction welding the fan blades 100 to the hub, or at least linear friction welding the aerofoil portions 110 to a hub that includes radially inner stub portions of the fan blades 100.

Figure 8:
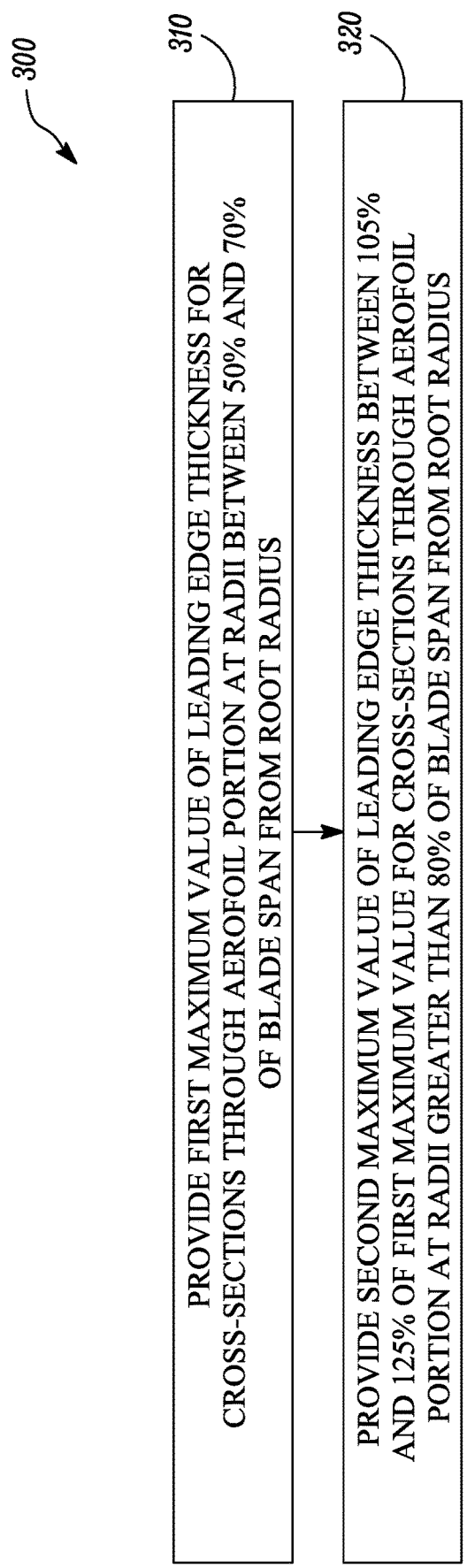
FIG. 8 is a flowchart depicting various steps of a method of minimising an impact of a bird strike on a fan blade of a gas turbine engine in accordance with an embodiment of the present disclosure.

FIG. 8 shows a flowchart depicting various steps of a method 300 of minimising an impact of a bird strike on a fan blade (e.g., the fan blade 100 of FIGS. 4 and 5) of a gas turbine engine (e.g., the gas turbine engine 10 of FIG. 1). The method 300 may also be a method of designing the fan blade 100. The method 300 will be described with additional reference to FIGS. 4 to 7.

The fan blade has an aerofoil portion having a leading edge extending from a root to a tip. A distance between the leading edge at the root and the leading edge at the tip defines a blade span. A leading edge thickness is defined as a thickness of a cross-section at a given radius at a location along a camber line that is 9% of the total length of the camber line from the leading edge.

At step 310, the method 300 includes providing a first maximum value of the leading edge thickness for cross-sections through the aerofoil portion at radii between 50% and 70% of the blade span from a root radius. For example, the method 300 may include providing the first maximum value T1max of the leading edge thickness TLE for cross-sections through the aerofoil portion 110 at radii between 50% and 70% of the blade span 145 from the root radius. In other words, the method 300 may include providing the first maximum value T1max of the leading edge thickness TLE for cross-sections through the aerofoil portion 110 in the region 146.

At step 320, the method 300 further includes providing a second maximum value of the leading edge thickness for cross-sections through the aerofoil portion at radii greater than 80% of the blade span from the root radius. The second maximum value is between 105% and 125% of the first maximum value. For example, the method 300 may include providing the second maximum value T2max of the leading edge thickness TLE for cross-sections through the aerofoil portion 110 at radii greater than 80% of the blade span 145 from the root radius. In other words, the method 300 may include providing the second maximum value T2max of the leading edge thickness TLE for cross-sections through the aerofoil portion 110 in the region 144.

In some embodiments, the method 300 may further include providing a first average value of the leading edge thickness for cross-sections through the aerofoil portion at radii between 60% and 70% of the blade span from the root radius. For example, the method 300 may include providing the first average value T1avg of the leading edge thickness TLE for cross-sections through the aerofoil portion 110 at radii between 60% and 70% of the blade span 145 from the root radius. In other words, the method 300 may include providing the first average value T1avg of the leading edge thickness TLE for cross-sections through the aerofoil portion 110 in the region 148.

In some embodiments, the method 300 may further include providing a second average value of the leading edge thickness for cross-sections through the aerofoil portion at radii greater than 80% of the blade span from the root radius. The second average value is between 105% and 125% of the first average value. For example, the method 300 may further include providing the second average value T2avg of the leading edge thickness TLE for cross-sections through the aerofoil portion 110 at radii greater than 80% of the blade span 145 from the root radius. In other words, the method 300 may further include providing the second average value T2avg of the leading edge thickness TLE for cross-sections through the aerofoil portion 110 in the region 144.

In some embodiments, the method 300 may further include providing a first constant value of the leading edge thickness for all cross-sections through the aerofoil portion at radii between 60% and 70% of the blade span from the root radius. For example, the method 300 may include providing the first constant value T1c of the leading edge thickness TLE for all cross-sections through the aerofoil portion 110 at radii between 60% and 70% of the blade span 145 from the root radius. In other words, the method 300 may include providing the first constant value T1c of the leading edge thickness TLE for all cross-sections through the aerofoil portion 110 in the region 148.

In some embodiments, the method 300 may further include providing a second constant value for all cross-sections through the aerofoil portion at radii greater than 80% of the blade span from the root radius. The second constant value is between 105% and 125% of the first constant value. For example, the method 300 may include providing the second constant value T2c for all cross-sections through the aerofoil portion 110 at radii greater than 80% of the blade span 145 from the root radius. In other words, the method 300 may include providing the second constant value T2c for all cross-sections through the aerofoil portion 110 in the region 144.

In some embodiments, the method 300 may further include providing the leading edge thickness for all cross-sections through the aerofoil portion at radii greater than 80% of the blade span from the root radius greater than 105% and less than 125% of the leading edge thickness for all cross-sections through the aerofoil portion at radii between 60% and 70% of the blade span from the root radius. For example, the method 300 may include providing the leading edge thickness TLE for all cross-sections through the aerofoil portion 110 at radii greater than 80% of the blade span 145 from the root radius greater than 105% and less than 125% of the leading edge thickness TLE for all cross-sections through the aerofoil portion 110 at radii between 60% and 70% of the blade span 145 from the root radius. As a result, the leading edge thickness TLE for all cross-sections through the aerofoil portion 110 in the region 144 may be greater than 105% and less than 125% of the leading edge thickness TLE for all cross-sections through the aerofoil portion 110 in the region 148.

In some embodiments, the method 300 may further include increasing the leading edge thickness linearly with respect to the blade span for cross-sections through the aerofoil portion at radii between 70% and 80% of the blade span from the root radius. For example, the method 300 may include increasing the leading edge thickness TLE linearly with respect to the blade span 145 for cross-sections through the aerofoil portion 110 at radii between 70% and 80% of the blade span 145 from the root radius.

As an example, in some embodiments, the method 300 may include increasing the leading edge thickness TLE linearly from the first maximum value T1max to the second maximum value T2max for cross-sections through the aerofoil portion 110 at radii between 70% and 80% of the blade span 145 from the root radius. In some embodiments, the method 300 may include increasing the leading edge thickness TLE linearly from the first average value T1 avg to the second average value T2avg for cross-sections through the aerofoil portion 110 at radii between 70% and 80% of the blade span 145 from the root radius. In some embodiments, the method 300 may include increasing the leading edge thickness TLE linearly from the first constant value T1c to the second constant value T2c for cross-sections through the aerofoil portion 110 at radii between 70% and 80% of the blade span 145 from the root radius.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A fan blade for a gas turbine engine, the fan blade comprising:
    an aerofoil portion comprising a leading edge extending from a root to a tip, a distance between the leading edge at the root and the leading edge at the tip defining a blade span, wherein:
    a leading edge thickness is defined as a thickness of a cross-section at a given radius along the blade span at a location along a camber line that is 9% of a total length of the camber line from the leading edge;
    for cross-sections through the aerofoil portion at radii between 50% and 70% of the blade span from a root radius, the leading edge thickness comprises a first maximum value;
    for cross-sections through the aerofoil portion at radii greater than 70% of the blade span from the root radius, the leading edge thickness comprises a second maximum value; and
    the second maximum value is between 105% and 125% of the first maximum value.

2. The fan blade of claim 1, wherein:
    for cross-sections through the aerofoil portion at radii between 60% and 70% of the blade span from the root radius, the leading edge thickness comprises a first average value;
    for cross-sections through the aerofoil portion at radii greater than 80% of the blade span from the root radius, the leading edge thickness comprises a second average value; and
    the second average value is between 105% and 125% of the first average value.

3. The fan blade of claim 1, wherein:
    for all cross-sections through the aerofoil portion at radii between 60% and 70% of the blade span from the root radius, the leading edge thickness comprises a first constant value;
    for all cross-sections through the aerofoil portion at radii greater than 80% of the blade span from the root radius, the leading edge thickness comprises a second constant value; and
    the second constant value is between 105% and 125% of the first constant value.

4. The fan blade of claim 1, wherein:
    for all cross-sections through the aerofoil portion at radii greater than 80% of the blade span from the root radius, the leading edge thickness is greater than 105% and less than 125% of the leading edge thickness for all cross-sections through the aerofoil portion at radii between 60% and 70% of the blade span from the root radius.

5. The fan blade of claim 1, wherein:
    for cross-sections through the aerofoil portion at radii between 70% and 80% of the blade span from the root radius, the leading edge thickness increases linearly with respect to the blade span.

6. The fan blade of claim 1, further comprising:
    a platform; and
    a root portion;
    wherein the root portion extends between the platform and the root of the aerofoil portion.

7. The fan blade of claim 6, wherein a radial extent of the root portion is less than or equal to 7% of the blade span.

8. The fan blade of claim 1, further comprising a tip portion that extends at least radially away from the tip of the aerofoil portion.

9. The fan blade of claim 8, wherein a radial extent of the tip portion is less than or equal to 7% of the blade span.

10. A gas turbine engine for an aircraft, the gas turbine engine comprising:
    an engine core comprising a turbine, a compressor, and a core shaft connecting the turbine to the compressor;
    a fan located upstream of the engine core, the fan comprising a plurality of fan blades; and
    a gearbox that receives an input from the core shaft and outputs drive to the fan so as to drive the fan at a lower rotational speed than the core shaft;
    wherein each of the plurality of fan blades are the fan blade of claim 1.

11. The gas turbine engine of claim 10, wherein:
    the turbine is a first turbine, the compressor is a first compressor, and the core shaft is a first core shaft;
    the engine core further comprises a second turbine, a second compressor, and a second core shaft connecting the second turbine to the second compressor; and
    the second turbine, the second compressor, and the second core shaft are arranged to rotate at a higher rotational speed than the first core shaft.

* * * * *